United States Patent Office 3,483,697
Patented Dec. 16, 1969

3,483,697
GAS TURBINE ENGINE WITH
PRESSURE EXCHANGER
Philip Charles Ruffles and Douglas Herbert Williamson, Derby, England, assignors to Rolls-Royce Limited, Derby, England, a British company
Filed Sept. 20, 1967, Ser. No. 669,055
Claims priority, application Great Britain, Oct. 14, 1966, 46,104/66
Int. Cl. F02c 3/02
U.S. Cl. 60—39.45
6 Claims

ABSTRACT OF THE DISCLOSURE

A gas turbine engine has a rotary pressure exchanger which is mounted at the rear of the engine adjacent to and upstream of the turbine and which is provided with a ring of cells. Compressed air is led from the compressor to the combustion equipment via the cells of the pressure exchanger, and combustion gases are led from the combustion equipment to the turbine means via the cells of the pressure exchanger.

---

This invention concerns a gas turbine engine.

According to the present invention, there is provided a gas turbine engine comprising compressor means mounted at the front of the engine, combustion equipment, turbine means, a rotary pressure exchanger which is mounted at the rear of the engine adjacent to the upstream side of the turbine means and which is provided with a ring of cells, means for rotating the pressure exchanger, and ducting for leading compressed air from the compressor means to the combustion equipment via the cells of the pressure exchanger and for leading combustion gases from the combustion equipment to the turbine means via the cells of the pressure exchanger.

Since the pressure exchanger is mounted adjacent the turbine means of the engine, combustion gases may pass from the pressure exchanger to the turbine means with minimum loss of power therebetween. Moreover, the combustion equipment may be so sited that the combustion gases may be ducted from the combustion equipment to the pressure exchanger in a relatively short length of ducting, and therefore with minimum losses and cooling.

The pressure exchanger is preferably so formed as to be rotated by the gases supplied thereto.

The turbine means may include a free turbine. The turbine means may, moreover, comprise a high pressure turbine which drives the compressor means through a first shaft, the free turbine being a low pressure turbine which drives a second shaft mounted concentrically about the first shaft.

The compressor means may include a final centrifugal stage for directing the compressed air radially outwardly into a duct or ducts leading to the pressure exchanger.

In one embodiment of the present invention, the pressure exchanger is a reverse flow pressure exchanger, the combustion equipment comprising at least one combustion chamber disposed radially outwardly of the turbine means. In this embodiment, there may be two diametrically oppositely disposed combustion chambers.

In an alternative embodiment of the present invention, the pressure exchanger is a through flow pressure exchanger, the combustion equipment being mounted to the rear of the pressure exchanger.

Figure 1:
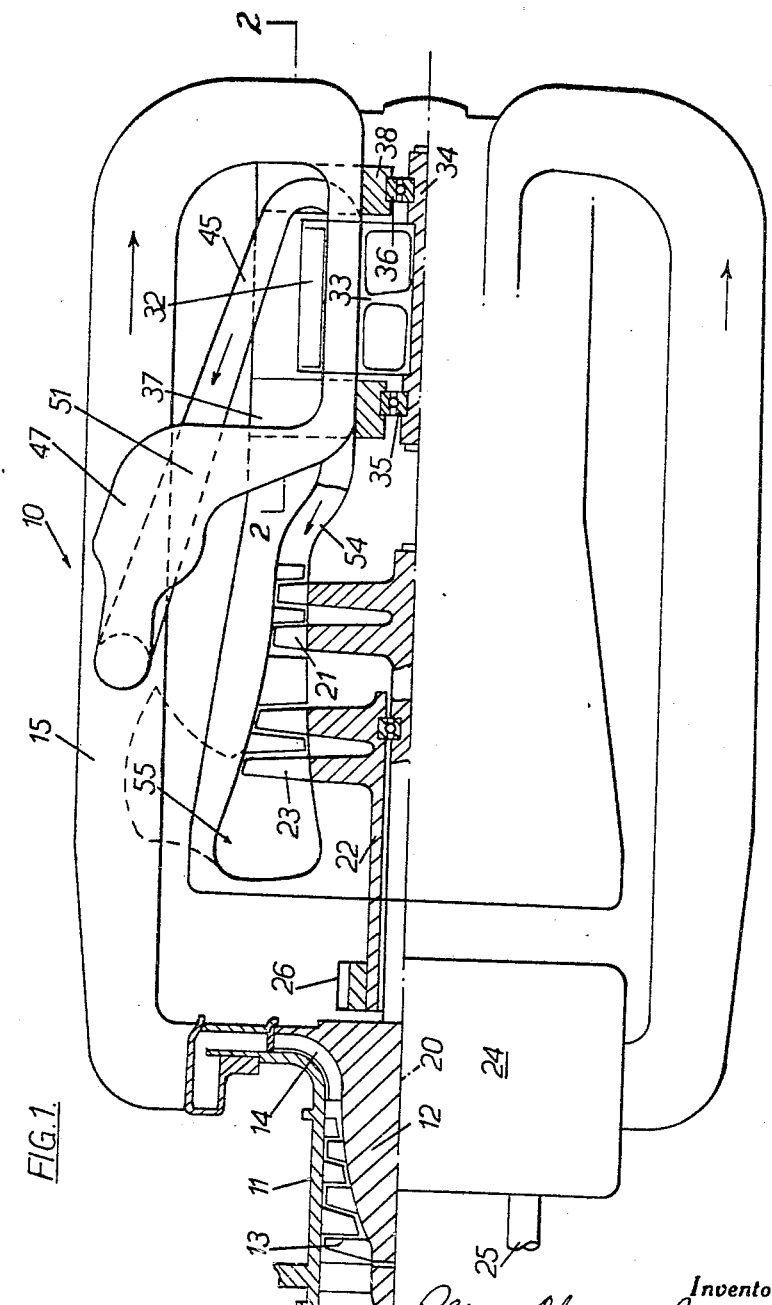
Figure 2:
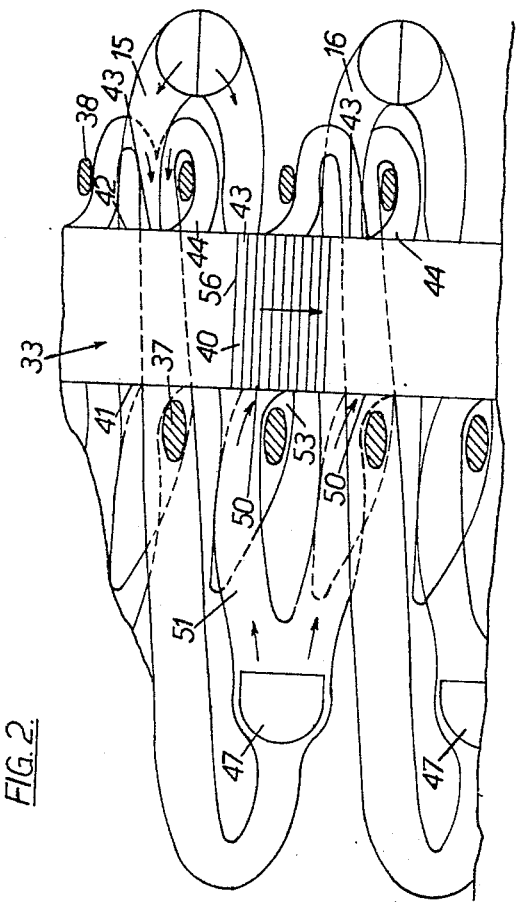
Figure 3:
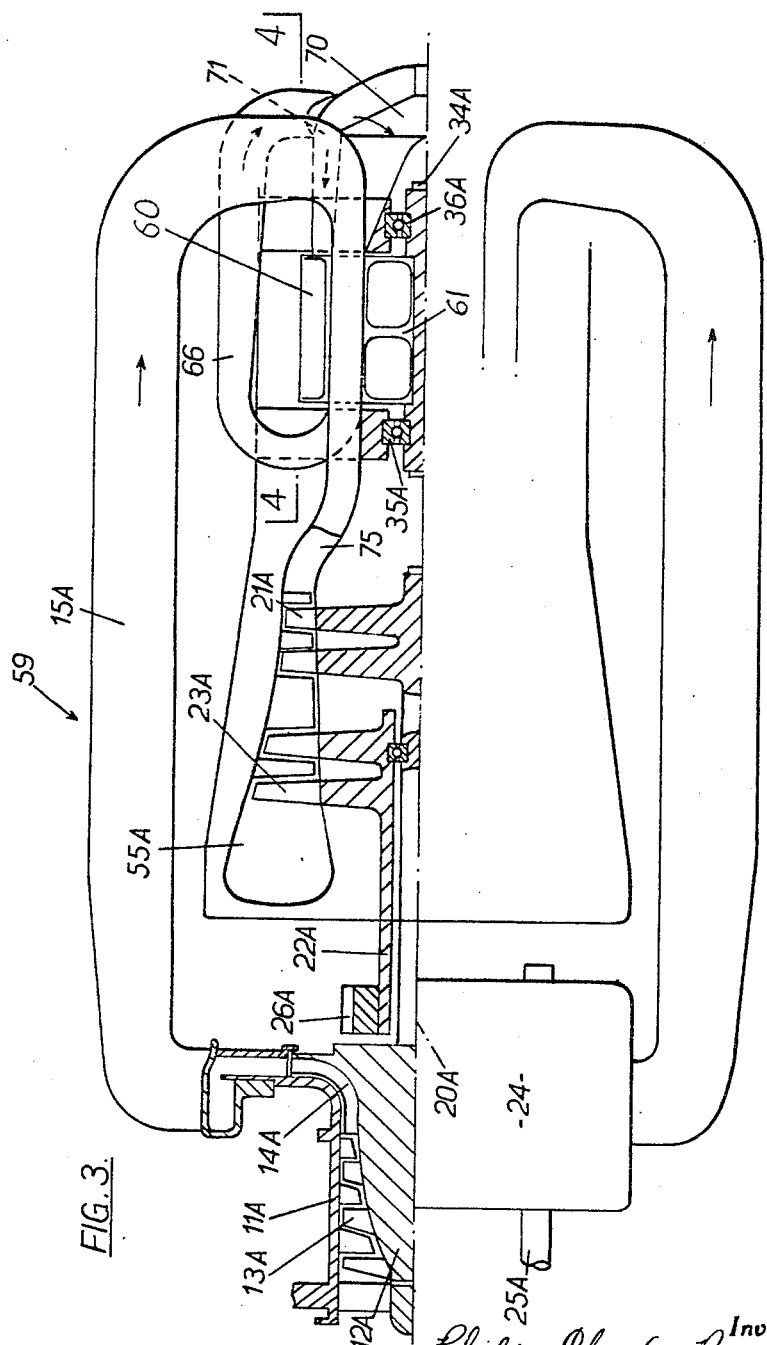
Figure 4:
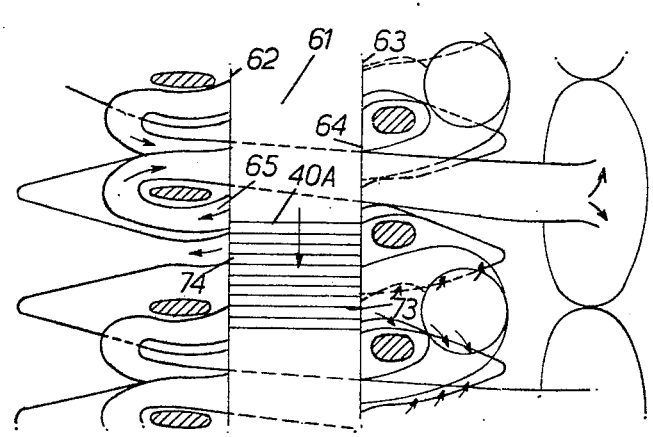

The invention is illustrated, merely by way of example, in the accompanying drawings, in which:

FIGURE 1 is a sectional view of one embodiment of a gas turbine engine according to the present invention, only one half thereof being shown in detail, FIGURE 2 is a developed view taken on the line 2—2 of FIGURE 1, FIGURE 3 is a view similar to FIGURE 1, but illustrating on alternative embodiment of the present invention, and FIGURE 4 is a developed view taken on the line 4—4 of FIGURE 3.

Referring first to FIGURES 1 and 2, a gas turbine engine 10 has an engine casing 11 in the forward end of which there is disposed a compressor 12. The compressor 12 has three axial stages 13 and a final centrifugal stage 14.

The final centrifugal stage 14 directs the air which has been compressed by the compressor 12 radially outwardly into two axially extending, diametrically oppositely disposed, ducts 15 and 16 which are disposed externally of the casing 11 and extend to the rear end of the latter.

The compressor 12 is mounted on a shaft 20 which is driven by a two-stage high pressure turbine 21. Mounted concentrically about the shaft 20 is a shaft 22 which is driven by a two stage low pressure free turbine 23.

The forward end of the shaft 22 is provided with gear 26 which, by way of a gear box 24, drives a main output shaft 25. The latter may drive a conventional propeller (not shown) or a helicopter rotor (not shown).

Mounted at the rear of the engine and adjacent to, and upstream of, the high pressure turbine 21 is a rotary pressure exchanger 32 having a rotor 33 mounted on a shaft 34 whose axis is collinear with the engine axis. The shaft 34 is mounted in bearings 35, 36 which are respectively supported from the rear end of the casing 11 by way of four agularly spaced apart struts 37 and four such struts 38. The rotor 33 is provided with a ring of cells 40 which are open at their opposite ends.

Pressure exchangers are well known in this art, and the pressure exchangers shown in the drawings of this application do not form a separate invention. Reference is made to Waleffe Patent 2,901,163 of Aug. 25, 1959 for a general discussion and description of pressure exchangers of the type contemplated for use with this invention.

The rotor 33 is mounted between end plates 41, 42. The end plate 42 is provided with a plurality of angularly spaced apart ports 43 through which compressed air from the compressor 12, which has passed to the pressure exchanger 32 through the ducts 15, 16, may enter the cells 40. The pressure exchanger 32 is a reverse flow pressure exchanger, the compressed air which passes into the cells 40 through the ports 43 being reversed in direction within the cells 40 and passing out therefrom through a plurality of angularly spaced apart ports 44 which are arranged alternately with the ports 43.

Compressed air passing out of the cells 40 and through the ports 44 pass via two diametrically oppositely disposed ducts 45 to combustion chambers 47 which are disposed radially outwardly of the turbine 21.

The end plate 41 is provided with a plurality of angularly spaced apart ports 50, combustion gases from the combustion chambers 47, being supplied via ducts 51 and via the ports 50 to the cells 40.

Combustion gases which have so entered the cells 40 are reversed in direction therein and leave the cells 40 through a plurality of angularly spaced apart ports 53 which are arranged alternately with the ports 50. Combustion gases which pass out of the cells 40 through the ports 53 flow through an annular duct 54 so as to pass through the turbines 21, 23 and so to an exhaust volute 55.

The cells 40 are defined between vanes 56 which are so formed that the gases passing into and out of the cells 40 act on the vanes 56 so as to effect rotation of the rotor 33. The compressed air supplied to the cells 40 is further compressed therein by direct energy transfer from the combustion gases, the combustion gases being expanded in the cells 40 before being passed to the turbines 21, 23.

As will be appreciated, the arrangement described above enables the high velocity combustion gases passing out of the cells 40 of the pressure exchanger 32 to be ducted directly to the turbines 21, 23 through a comparatively short duct 54 and therefore with minimum loss. It also enables the combustion gases from the combustion chambers 47 to be ducted to the pressure exchanger 32 through relatively short ducts 51.

In FIGURES 3 and 4, there is shown a gas turbine engine 59 which is generally similar to that of FIGURES 1 and 2 and which for this reason will not be described in detail, similar parts being given similar reference numerals with the addition of the suffix A.

In the case of the engine 59 of FIGURES 3 and 4, however, a through flow as opposed to a reverse flow rotary pressure exchanger 60 is used having a rotor 61 provided with a ring of cells 40A are disposed between end plates 62, 63. The end plate 63 is provided with a plurality of angularly spaced apart ports 64 through which air which has been compressed in the compressor 12A and which has passed through the ducts 15A may enter the cells 40A. This compressed air is not however reversed in flow within the cells 40A but passes axially therethrough to pass through a plurality of angularly spaced apart ports 65 in the end plate 62. The compressed air which has passed through the ports 65 is supplied to two diametrically oppositely disposed ducts 66 which lead to a single common combustion chamber 70. The combustion chamber 70 is disposed at the extreme rear of the gas turbine engine 59 and may be formed as a composite unit with the pressure exchanger 60.

The combustion gases from the combustion chamber 70 are supplied through ducts 71, to the cells 40A via a plurality of angularly spaced apart ports 73 which are disposed in the end plate 63 alternately with the ports 64 therein.

The combustion gases after passing through the cells 40A pass out of the latter axially through a plurality of angularly spaced apart ports 74 which are arranged in the end plate 62 alternately with the ports 65. The combustion gases which have passed through the ports 74 pass to an annular duct 75 through which they flow to the turbines 21A, 23A, and so to the exhaust volute 55A.

As will be appreciated, in the construction of FIGURES 3 and 4, as in the similar construction of FIGURES 1 and 2, the pressure exchanger 60 is disposed adjacent to and to the rear of the turbine 21A so that the combustion gases pass from the former to the latter with minimum losses.

The through flow pressure exchanger 60 of FIGURES 3 and 4 has a lower overall efficiency than the reverse flow pressure exchanger 32 shown in FIGURES 1 and 2. As against this, the pressure exchanger 60 has the advantage of having a uniform temperature along its length whereby to minimize thermal stresses. Moreover, the maximum temperature of the pressure exchanger 60 is lower than in the case of the pressure exchanger 32 and may therefore be arranged to be well within the range of conventional materials.

We claim:
1. A gas turbine engine comprising compressor means mounted at the front of the engine, combustion equipment and turbine means mounted at the central portion of the engine, a through flow pressure exchanger which is mounted at the rear of the engine adjacent to the upstream side of the turbine means and which is provided with a ring of cells, means mounting the pressure exchanger for rotation, and ducting leading compressed air from the compressor means to the combustion equipment via the cells of the pressure exchanger and for leading combustion gases from the combustion equipment to the turbine means via the cells of the pressure exchanger, said combustion equipment comprising two combustion chambers disposed radially outwardly of and diametrically opposite to the turbine means.

2. A gas turbine engine comprising compressor means mounted at the front of the engine, combustion equipment and turbine means mounted at the central portion of the engine, a reverse flow pressure exchanger which is mounted at the rear of the engine adjacent to the upstream side of the turbine means and which is provided with a ring of cells, means mounting the pressure exchanger for rotation, and ducting leading compressed air from the compressor means to the combustion equipment via the cells of the pressure exchanger and for leading combustion gases from the combustion equipment to the turbine means via the cells of the pressure exchanger, said combustion equipment comprising two combustion chambers disposed radially outwardly of and diametrically opposite to the turbine means.

3. A gas turbine engine as claimed in claim 2 in which the pressure exchanger is rotated by the gases supplied thereto.

4. A gas turbine engine as claimed in claim 2 in which the compressor means include a final centrifugal stage for directing the compressed air radially outwardly into at least one duct leading to the pressure exchanger.

5. A gas turbine engine as claimed in claim 2 in which the turbine means include a free turbine.

6. A gas turbine engine as claimed in claim 5 in which the turbine means comprise a high pressure turbine which drives the compressor means through a first shaft, the free turbine being a low pressure turbine which drives a second shaft mounted concentrically about the first shaft.

References Cited

UNITED STATES PATENTS

| 2,399,394 | 4/1946 | Seippel | 60—39.45 |
| 2,461,186 | 2/1949 | Seippel | 60—39.45 X |
| 2,764,340 | 9/1956 | Jendrassik | 60—39.45 X |
| 3,022,050 | 2/1962 | Spalding | 60—39.45 X |
| 3,043,106 | 7/1962 | Coleman. | |
| 3,091,083 | 5/1963 | Spalding | 60—39.45 |
| 3,367,563 | 2/1968 | Hertzberg et al. | 60—39.45 X |
| 2,746,246 | 5/1956 | Valota | 60—39.16 |
| 2,901,163 | 8/1959 | Waleffe. | |
| 3,037,349 | 6/1962 | Gassmann | 60—39.16 |

MARK M. NEWMAN, Primary Examiner

ALLAN D. HERRMANN, Assistant Examiner

U.S. Cl. X.R.

60—39.16.